United States Patent [19]

Pellegri et al.

[11] 4,172,773

[45] Oct. 30, 1979

[54] NOVEL HALOGENATION PROCESS AND APPARATUS

[75] Inventors: Alberto Pellegri, Luino, Italy; Placido M. Spaziante, Lugano, Switzerland

[73] Assignee: Oronzio de Nora Impianti Elettrochimici S.p.A., Milan, Italy

[21] Appl. No.: 929,494

[22] Filed: Jul. 31, 1978

[30] Foreign Application Priority Data

May 11, 1978 [IT] Italy ............................. 23283 A/78

[51] Int. Cl.² .............................................. C02B 1/82
[52] U.S. Cl. ..................................... 204/149; 204/95; 204/151
[58] Field of Search ................... 204/94, 95, 149, 151; 210/22, 62, 321

[56] References Cited

U.S. PATENT DOCUMENTS

| | | | |
|---|---|---|---|
| 1,603,298 | 10/1926 | Speed | 204/151 X |
| 2,341,356 | 2/1944 | Briggs | 204/151 |
| 2,546,254 | 3/1951 | Briggs | 204/151 X |
| 2,773,025 | 12/1956 | Ricks et al. | 204/149 |
| 2,793,183 | 5/1957 | Thurman | 204/151 |
| 3,459,646 | 8/1969 | Carlson | 204/153 |

*Primary Examiner*—Arthur C. Prescott
*Attorney, Agent, or Firm*—Hammond & Littell

[57] ABSTRACT

A novel process for the halogenation of water comprising passing an electrolysis current through a porous, permeable anode and a cathode forming an electrodic gap with water passing therethrough, passing an aqueous solution of an alkali metal halide containing at least 25 g/l of said halide through the porous, permeable anode into the electrodic gap and controlling the hydrodynamic flow through the said anode to maintain the weight ratio of active halogen to halide in the water leaving the electrodic gap of at least 0.2, preferably near 1, and a novel electrolytic apparatus for effecting the said electrolysis and more generally suited for releasing anodically oxidized chemical species into a supporting electrolyte flowing through the cell while restraining the release of the non-oxidized species into the supporting electrolyte, that is into the effluent solution.

9 Claims, 6 Drawing Figures

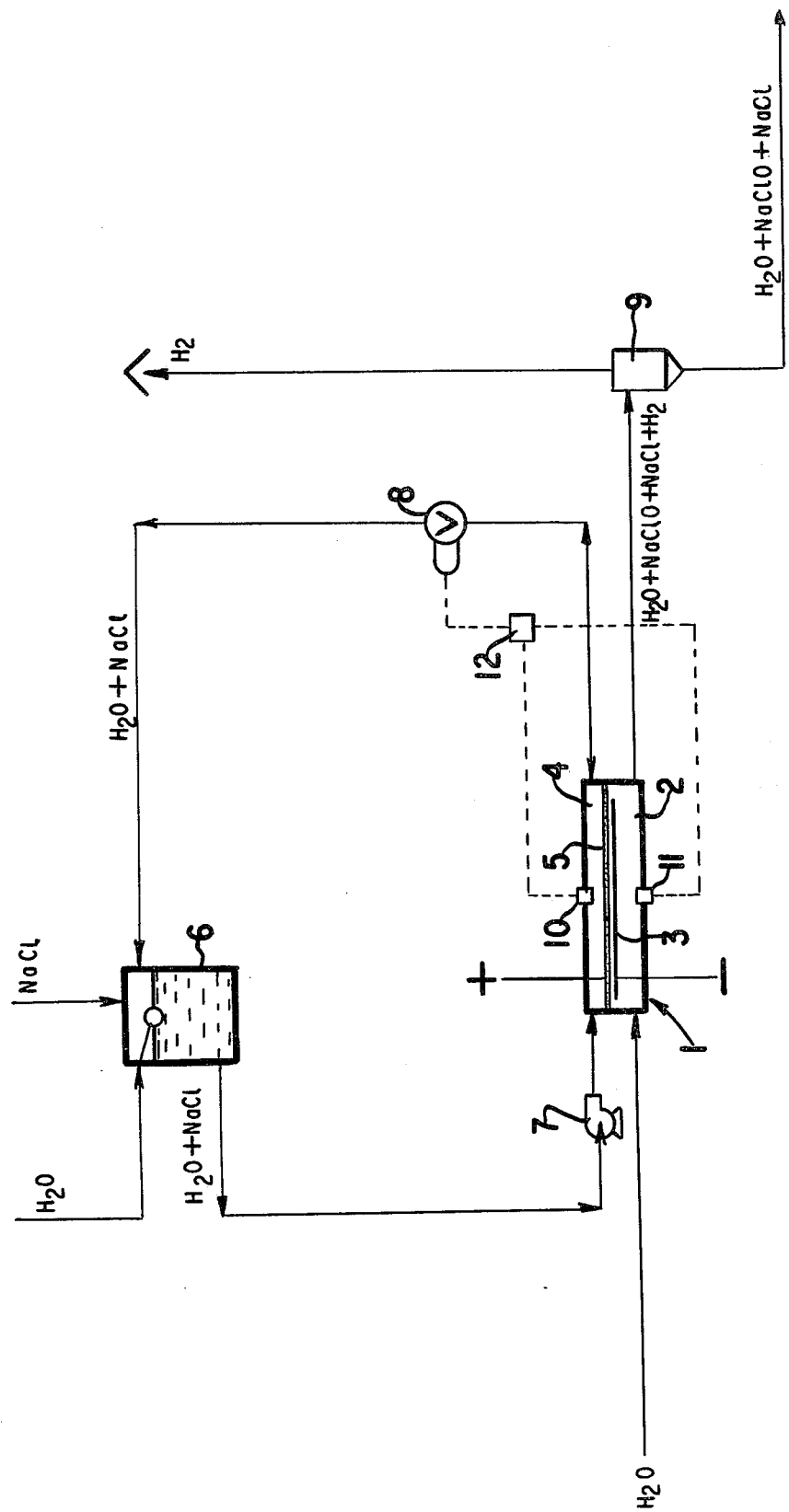

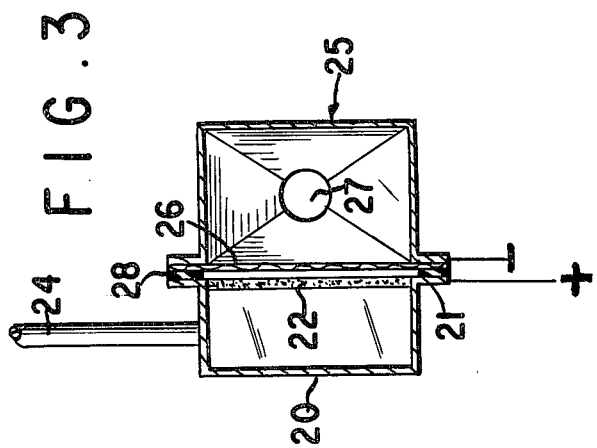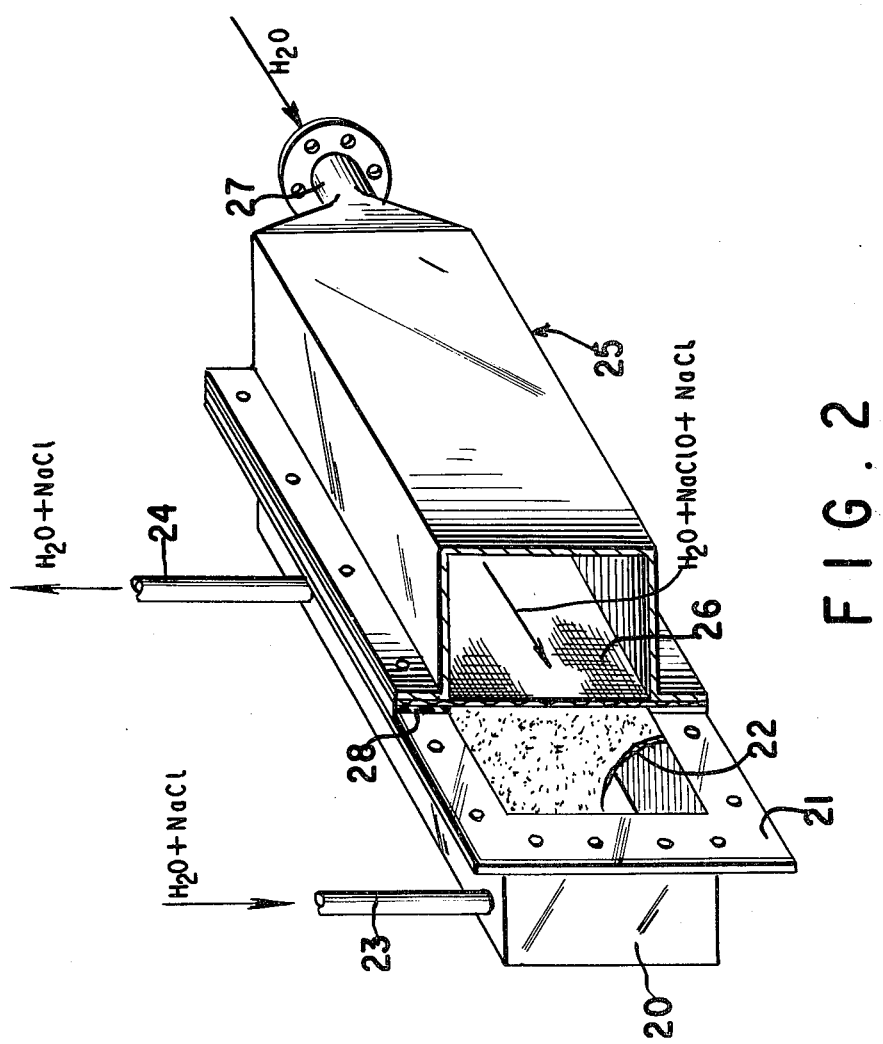

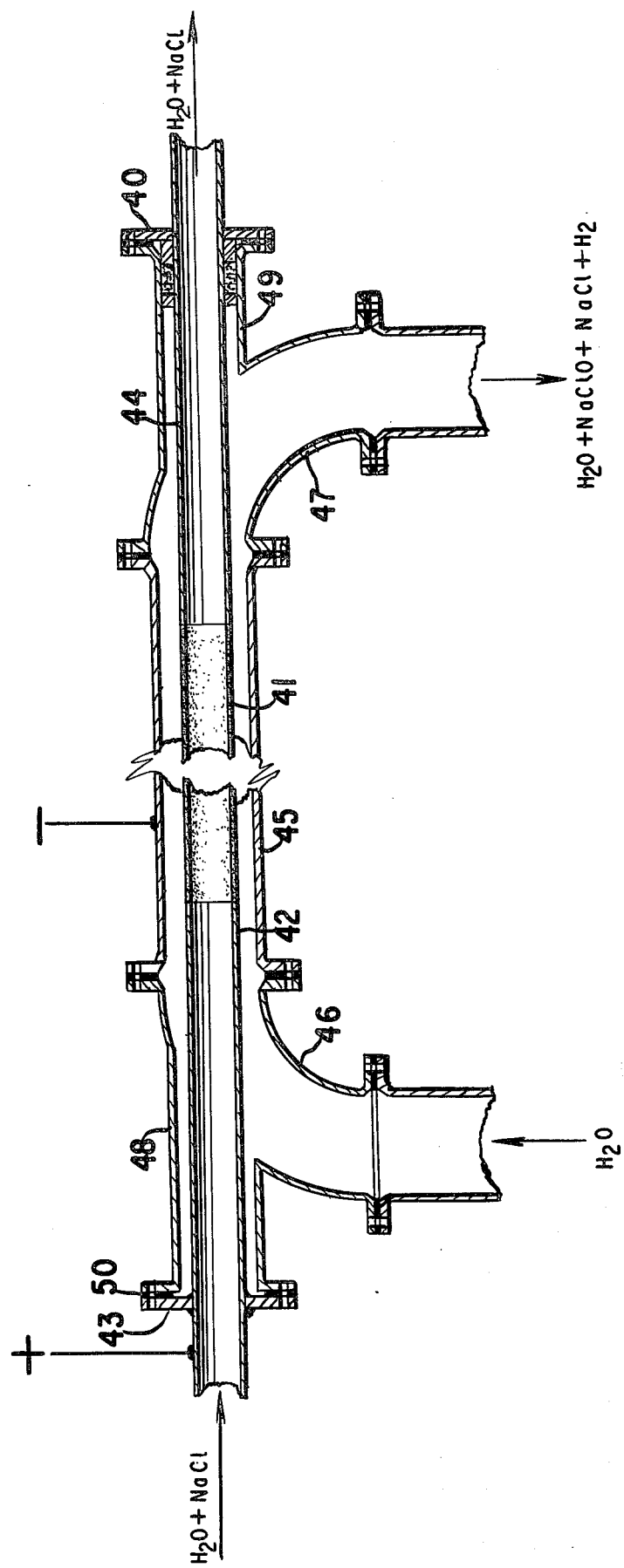

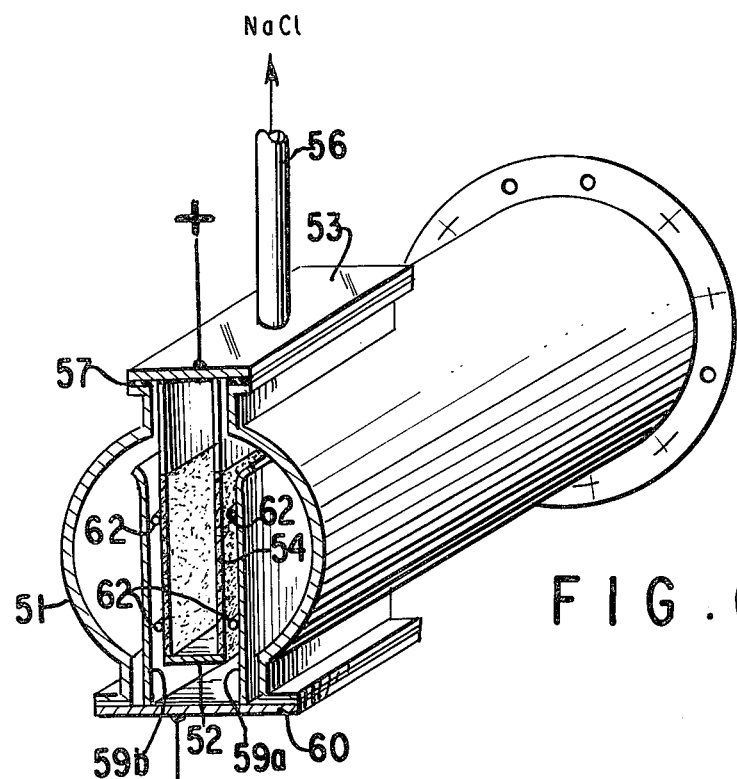
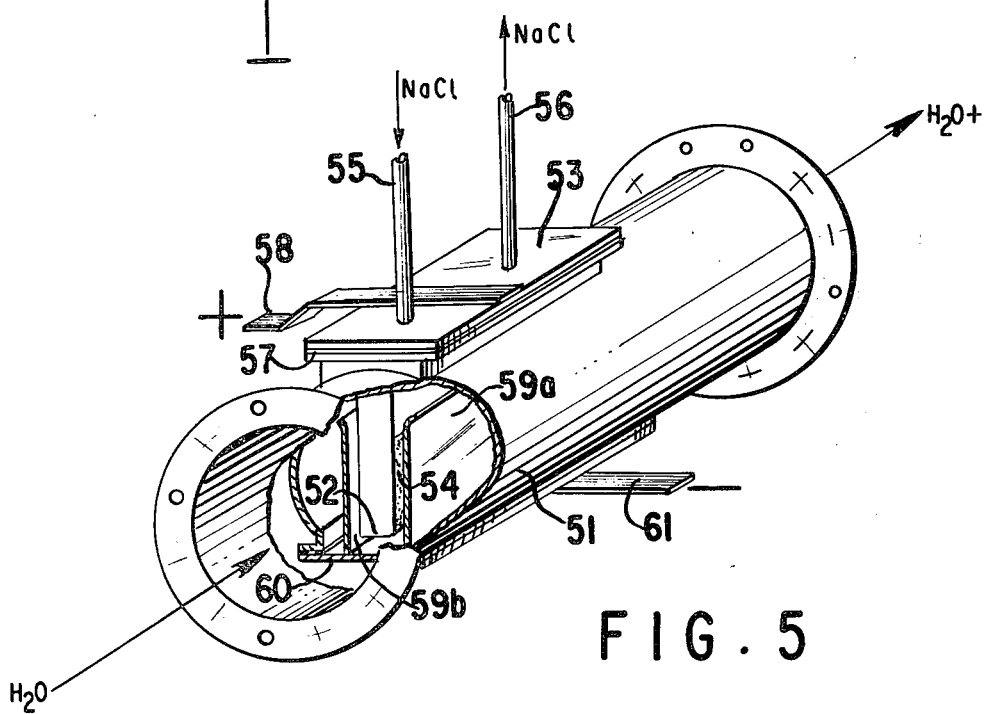

NOVEL HALOGENATION PROCESS AND APPARATUS

STATE OF THE ART

Active chlorine or hypochlorite is extensively used for water sterilization, not only to obtain potable water but also for preventing the proliferation of bacteria, biological concretions and algae, and for oxidizing organic matter in swimming pools and in industrial cooling water systems. The amount of active chlorine required for this type of treatment is in the range of 1 to 2 mg/l. The on site electrolytic production of active chlorine by electrolysis of alkali metal chloride presents several advantages, particularly as regards safety and control systems, over the utilization of gaseous chlorine from liquid chlorine bottles or the use of hypochlorite which involves transportation, storage, and dosing apparatus of absolute reliability and provision of costly safety features.

The advantages of on site electrolytic production of active chlorine can be best appreciated by considering that the active chlorine produced remains completely dissolved in the electrolyte and, moreover, it may be produced on demand in whatever quantity is required. In fact, the quantity of active chlorine produced is proportional to the electrolysis current and therefore it is sufficient to control the current, with respect to the amount of water to be treated, to maintain the chlorine content within the desired limits.

According to known electrolytic methods, dilute brine containing from 25 to 45 g/l of sodium chloride is circulated at least once through one or more electrolysis cells in series to obtain an effluent solution containing from 0.1 to 8 g/l of active chlorine and from 24 to 40 g/l of sodium chloride. Gaseous hydrogen produced at the cathode is vented from the effluent solution which is then suitably added to the main stream of water to be treated to obtain a concentration of active chlorine of about 1 to 5 mg/l in the water.

Active chlorine or active halide is intended to be the concentration of the oxidation equivalents, expressed as weight unit per volume of the electrolyte, multiplied by the atomic weight of the relative halogen (chlorine=35.457), considering that: 1 mole of dissolved $Cl_2$ corresponds to 2 equivalents; 1 mole of dissolved $HClO$ corresponds to 2 equivalents; 1 gram ion of dissolved $ClO^-$ corresponds to 2 equivalents; and 1 gram ion of dissolved $ClO_3^-$ corresponds to 6 equivalents according to the relative reactions:

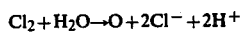

$Cl_2 + H_2O \rightarrow O + 2Cl^- + 2H^+$

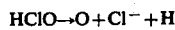

$HClO \rightarrow O + Cl^- + H$

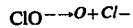

$ClO^- \rightarrow O + Cl^-$

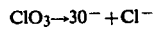

$ClO_3^- \rightarrow 3O^- + Cl^-$

In practice, the active chlorine concentration expressed in grams/liter is substantially identical to the concentration in grams/liter of hypochlorite. Therefore, the expressions "active chlorine" and "hypochlorite" in the present description are to be considered equivalent in first approximation.

The known electrolytic process, as commonly intended and realized, is subject to well known technical limitations which have a considerable impact on the economics of the process. One of the essential conditions necessary to achieve a good overall current efficiency of the on site electrolytic process for the chlorination of water directly is to obtain a current efficiency for the desired anodic reaction, that is chlorine discharge, as high as possible with respect to the undesired side reactions, particularly oxygen discharge. Catalytic anodes having a low overvoltage to chlorine evolution are commonly used to favor this reaction over the undesired oxygen discharge reaction which takes place with anodic potentials exceeding by 400–450 mV the chlorine evolution anodic potential.

Nevertheless, in order to operate at economically acceptable current densities, the sodium chloride content in the electrolyte must always exceed 25-35 g/l since lower concentrations of chloride drastically reduces the faraday efficiency for chlorine evolution while the quantity of oxygen evolved at the anode increases. This is due to the well known kinetic problems connected with diffusion of the chloride ions to the anode through the anode double layer. When operating at lower chloride concentration in the electrolyte, severe depletion of chloride ions in the anodic film occurs and this increases oxygen evolution. Oxygen evolution, besides lowering the overall current efficiency of the process, affects the anode lifetime which, whether made of graphite or of a valve metal coated with an electrocatalytic coating consisting of noble metals or oxides of the same, are subject to a rapid wear rate or to a rapid loss of catalytic activity.

However, the necessity to keep a sufficiently high sodium chloride concentration in the electrolyte entails several disadvantages. First of all, a great amount of salt is lost in the effluent and the salt content in the main stream of water treated by the addition of the effluent liquor from the cell is remarkably increased. The ratio between active chlorine and chloride added to the water, expressed in g/l, is always below 0.2 and practically seldom exceeds 0.05-0.1 g/l with the known processes. Another disadvantage is that it is practically impossible to treat the body of water directly by simply passing the water stream through the cell, but a concentrated solution containing hypochlorite and chloride leaving the electrolysis cell has to be collected in a separate tank and then the said concentrated solution has to be added to the electrolyte by means of adequate dosing systems.

OBJECTS OF THE INVENTION

It is an object of the invention to provide a novel method and a novel apparatus for halogenating water for sterilization purposes in a manner so as to obtain an effluent solution from wherein the ratio between the active halogen and the halide content is higher than 0.2, and preferably not lower than 0.3, and operating with high efficiency.

It is another object of the invention to provide a method and apparatus for halogenating water for sterilization purposes by producing the desired active haloven concentration with a low salt content directly in the stream of water to be treated.

It is another object of the invention to provide for a method and apparatus for the electrolytic production of aqueous hypochlorite solutions exhibiting a low chloride content.

It is a further object of the invention to provide a novel diaphragmless electrolytic cell particularly suited for releasing anodically oxidized chemical species into the supporting electrolyte flowing through the cell while restraining the release of the non-oxidated species into the supporting electrolyte.

These and other objects and advantages will become obvious from the following detailed description.

THE INVENTION

The novel process of the invention for the halogenation of water comprises passing an electrolysis current through a porous, permeable anode and a cathode forming an electrodic gap with water passing therethrough, passing an aqueous solution of an alkali metal halide containing at least 25 g/l of said halide through the porous permeable anode into the electrodic gap and controlling the hydrodynamic flow through the said anode to maintain the weight ratio of active halogen to halide in the water leaving the electrodic gap of at least 0.2.

The said process makes it possible to produce directly by electrolysis an aqueous solution of alkali metal hypohalites with a very low content of alkali metal halides and therefore with a reduced halide consumption while operating with high efficiency and at high current density. This is achieved utilizing two separate liquid circuits, one for the alkali metal halide solution and another for the electrolyte, that is for the formed hypohalite solution.

The process of the invention is best described and will be described by referring to the production of hypochlorite utilizing sodium chloride because of the great commercial acceptance of this process, but it is obvious that other electrolytic processes such as the production of potassium hypochlorite from potassium chloride, sodium chlorate from sodium chloride, sodium hypobromite from sodium bromide, may be performed by the present invention.

Preferably, the brine used is as concentrated as possible and, in the case of sodium chloride, it is preferably maintained in the range of 100 g/l to 300 g/l. Brine concentration can easily be kept constant by continuously circulating the brine through an external concentration stage and recycling the concentrated brine back to the cell compartment which is separated from the water flowing through the electrolytic cell by the porous anode.

The porous anode is preferably made of a sintered valve metal having a thickness in the range from 0.5 mm to 5 millimeters, a porosity ranging from 20 to 70% and an average pore diameter from 5 to 100 microns. More preferably, the anode has a porosity ranging from 30 to 65% and the average diameter of the pores ranges from 5 to 50 microns and is made of sintered titanium. However, it is obvious that a suitable valve metal porous anode can be prepared otherwise, for example by plasma jet deposition of a porous layer of a valve metal onto a foraminous structure of a valve metal, preferably an expanded sheet, which, besides acting as a supporting matrix and mechanical stiffener, also behaves as a current distributor for the whole anodic surface.

The porous valve metal anode is preferably activated by impregnation and deposition on the valve metal of a thin layer of non-passivatable material which is resistant to the anodic environment and is electrocatalytic to evolution of halogen from aqueous solutions. Suitable materials are, for example, the platinum group metals applied by thermal deposition to the porous structure of the valve metal by first impregnating the porous valve metal with a solution containing decomposable salts of the platinum group metals. Galvanic deposition of noble metals such as platinum, palladium, iridium, ruthenium, rhodium and osmium may also be used.

Oxides of the metals belonging to the Group VIII of the Periodic Table, catalytic oxides of other metals such as manganese, lead, tin or mixed oxides or mixtures of the oxides of the above metals and oxides of valve metals may also be utilized for activating the porous anode. The most preferred material is a mixed oxide of titanium and ruthenium applied by thermal decomposition in the presence of oxygen of a solution containing titanium and ruthenium salts and possibly small quantities of other metals salts, such as cobalt, nickel and tin applied to the sintered structure of titanium or other valve metal. The electrocatlytic coatings are more fully described in U.S. Pat. Nos. 3,711,383 and 3,632,498.

After activation, the porous anode surface facing the cathode surface may optionally be provided with a thin porous layer of a material such as polytetrafluoroethylene or other halogenated polymer to make the surface hydrophobic for retarding the transport of the aqueous phase across the porous anode. The porous layer of polytetrafluoroethylene or other suitable material may be applied onto the porous anode surface, for example, by depositing a solution or an emulsion of the polymer, removing the solvent and subjecting the surface to heat treatment. Spray application of polymer may be used as well.

The process of the present invention presents the great advantage over conventional techniques by permitting operation at very high current densities. Presently, in the known industrial processes, the current density seldom exceeds 400–1000 A/m$^2$. In fact, above these limits, an electrolyte containing a greater quantity of chloride has to be utilized to achieve acceptable current efficiency for chlorine evolution, but a solution with a concentration above 40 g/l of chloride is economically and technically disadvantageous because of the large waste of chloride and an excessive chloride content in the effluent would occur.

By the process of the present invention, it is possible to operate at a current density which may be 4000–5000 A/m$^2$ with a chlorine discharge current efficiency higher than 85%. When operating with a current density, for example within 2000–3500 A/m$^2$, it is possible to maintain a current efficiency for chlorine evolution higher than 96% with an extraordinary increase in the anode lifetime because the anodes are no longer subjected to the undesired, excessive oxygen evolution which causes the loss of catalytic activity of the noble metal oxide coating. Considering that chlorine evolution is thermodynamically favored with respect to oxygen evolution, the fact that the major portion of the active anodic surface is constantly wetted by concentrated brine favors chlorine discharge and effectively prevents oxygen discharge, even at relatively high current density.

Meanwhile, the chloride ions which tend to "diffuse" from the concentrated solution through the porous anode to the aqueous electrolyte circulating in the interelectrodic gap because of the concentration gradient and where necessary also to a slight pressure gradient purposedly maintained across the porous anode, are oxidized to chlorine while passing across the porous anode. Therefore, the chloride losses in the electrolyte which is in the hypochlorite solution produced are greatly reduced. The weight ratio between the active chlorine and the chloride ion contained in the effluent may be easily maintained above 0.2 and, preferably it is maintained between 0.3 and 0.8.

Reduction of water takes place at the surface of the cathode which is made of titanium, steel or other suitable material and the evolved gaseous hydrogen is vented from the cell together with the electrolyte, while oxidriles are formed according to the reaction:

$$H_2O - e^- \rightarrow \tfrac{1}{2}H_2 + OH^-$$

The chlorine evolved at the anode readily reacts with the hydroxide ions producing hypochlorite through the known chemical dismutation.

Practically, depending upon the desired minimum ratio between the concentrations of the active chlorine and the chloride contained in the cell effluent water, the more concentrated the brine is, the higher is the current density which can be used while maintaining a very high current efficiency for the halogen discharge and therefore a low oxygen evolution.

To provide a sufficient supply of chloride ions to the anode and to inhibit oxygen evolution, especially when using a porous anode with low permeability which is an anode with a lower porosity and/or smaller mean diameter pores, a certain pressure differential may be maintained through the porous anode to provide for a sufficient hydrodynamic flow of the concentrated brine across the porous anode towards the electrolyte flowing through the interelectrodic gap. It has been found that the required pressure differential seldom exceeds 1 meter of water column. Practically, 2 to 25 centimeters of water column are sufficient when utilizing commercial sintered valve metal. Under the above conditions, an automatic control of the pressure differential between the brine compartment and the water compartment should be provided to maintain the optimal process operation under all conditions, since possible pressure variations of the electrolyte due to transitory causes could adversely affect the electrolytic water chlorination process.

According to a preferred embodiment with an automatic control system, two pressure gauges are provided in the brine and in the electrolyte compartments respectively. The algebraic difference between the pressure in the two compartments are compared with a fixed reference signal which can be preset for establishing a certain pressure difference and acts on a control valve placed in the brine circuit downstream from the brine compartment so that the pressure difference across the porous anode can be kept constant independent of pressure variations which may occur either in the water or in the brine circuit.

The brine concentration in the cell compartment is maintained substantially constant by controlling the brine recycling speed, while the quantity of the water flowing between the porous anode and the cathode may vary within large limits depending on the desired hypochlorite (that is active chlorine) content in the effluent. Therefore, the electrolyte speed through the interelectrodic gap may vary within limits ranging from 1 cm/second to 1.0 m/second.

Alternatively, instead of utilizing re-cycling of the brine for maintaining constant the brine concentration, concentrated brine may be fed continously into the anode compartment by means of an adjustable or automatically controlled dosing pump capable of providing for the necessary hydraulic flow of the brine through the porous anode.

Other factors, besides the current efficiency for chlorine discharge at the anode, may affect the overall current efficiency of the electrolytic. In particular, the hypochlorite formed at the anode tends to decompose with consequent oxygen evolution or to dismutate to chlorate and furthermore cathodic reduction of the hypochlorite occurs at the cathode. While the first two chemical reactions are readily minimized by operating at low temperatures, that is to say below 25° C., the cathodic reduction of hypochlorite according to the reaction:

$$ClO^- + H_2O + 2e^- \rightarrow Cl^- + 2OH$$

is competitive with hydrogen evolution since its standard potential is about 1 Volt greater than the water reduction potential. Accordingly, the kinetic of this reaction is controlled by the convective and diffusive transport of hypochlorite from the anode towards the cathode. This secondary reaction is a major cause of the overall current efficiency loss. The loss due to this secondary reaction may be reduced by imparting to the electrolyte a laminar flow through the interelectrodic gap. Nevertheless, the mass transfer of hypochlorite from the bulk of the electrolyte to the cathode surface is proportional to the concentration of the hypochlorite in the electrolyte.

In the known processes, the necessity to maintain a relatively high chloride concentration in the electrolyte flowing through the cell does not permit direct chlorination of water, that is with a concentration of active chlorine (hypochlorite) as low as 1 to 2 mg/l, and therefore it is necessary to obtain a more concentrated solution containing up to 6–8 g/l of active chlorine (hypochlorite), which is then diluted into the main stream of water. At these high concentrations of hypochlorite, the loss of efficiency due to the cathodic reduction of hypochlorite is very high and the overall current efficiency may drop to less than 60%. In contrast thereto, the process of the invention permits chlorination of water directly to concentration on the order of 1–2 mg/l of active chlorine reducing the loss of efficiency due to the cathodic reduction of hypochlorite. These conditions are easily achieved by increasing the speed of the electrolyte (water) in the cell and/or by allowing the greater part of the water stream to by-pass the interelectrodic gap of the cell. However, it is also possible, by the process of the invention, to produce an effluent solution with an hypochlorite content as high as 8–10 g/l by increasing the residence time of the electrolyte in the cell or by using more cells in series in the usual manner.

Another remarkable loss in the overall current efficiency is caused by the anodic oxidation of hypochlorite to chlorate according to the reaction:

$$6ClO^- + 3H_2O \rightarrow 2ClO_3^- + 4Cl^- + 6H^+ + 3/2O_2 + 6e^{31}$$

The higher the hypochlorite concentration in the electrolyte and the current density are, the greater is the loss due to this reaction. Considering that hypochlorite is formed at the anode surface, it is practically impossible in conventional cells to control or to reduce this loss since the laminar flow imposed on the electrolyte for reducing hypochlorite diffusion towards the cathode and to prevent the cathodic reduction of the hypochlorite can only make even worse the conditions of a fast removal of hypochlorite which continuously forms at the anodic surface. By the process of the present invention, this cause of loss of efficiency is also effectively reduced.

As a matter of fact, it has been found that providing a small hydrodynamic flow of the brine through the porous anode, the overall current efficiency is drastically increased. This is presumably due to various factors which positively reduce the tendency of hypochlorite to be oxidized to chlorate at the anode. One of these factors is represented by the fact that chloride ions are effectively and constantly supplied directly at the anodic double layer over the entire active surface of the anode. Another fact that may be envisaged in a component of the hydrodynamic flow which tends to drag out, that is to remove from the active surface of the anode, the hypochlorite produced. The brine flow through the porous anode offers furthermore the advantage of reducing the cell voltage. On the other hand, within certain limits, this flow does not substantially lower the ratio between the active chlorine and the chloride contained in the effluent as it has been observed during the experiments.

The novel diaphragmless electrolytic cell of the invention is comprised of a first compartment containing a porous, permeable anode and a cathode forming an interelectrodic gap, a second compartment separated from the first compartment by the porous, permeable anode, means for introducing a solution containing anodically oxidable chemical species into the second compartment, means for circulating an electrolyte through the interelectrodic gap of the first compartment, means for controlling the hydrodynamic flow of the solution, contained into said second compartment, through the porous anode into the supporting electrolyte and means for impressing an electrolysis current between the said anode and cathode.

The novel diaphragmless electrolytic cell of the invention is particularly suited for releasing anodically oxidated chemical species (e.g. $Cl_2$) into a supporting electrolyte flowing through the cell (e.g. water) while restraining the release of the non-oxidated species (e.g. $Cl^-$) into the supporting electrolyte.

The porous anode is capable of restraining the intermixing between the solution fed into the second compartment of the cell and the supporting electrolyte flowing through the interelectrodic space of the cell whereby a large portion of the oxidizable chemical species which are passed through the porous anode by diffusion and, where necessary, also by hydrodynamic flow, are anodically oxidized before being released in the supporting electrolyte flowing through the cell.

The porous anode of the cell has a thickness comprised in the range from 0.5 to 5 mm, a porosity ranging from 20 to 70% and an average pore diameter ranging from 5 to 100 microns. More preferably, the anode has a porosity ranging from 30 to 65 and an average diameter of the pores comprised between 5 and 50 microns.

The porous anode is made of an anodically resistant conductive material and is preferably made of sintered valve metal activated with a non passivating catalytic material such as a noble metal or a noble metal oxide.

The cathode is made of a corrosion resistant conductive material presenting a low overpotential for the cathodic reaction supporting the electrolysis current impressed on the cell. In case of hydrogen evolution from aqueous supporting electrolytes the cathode is preferably made of valve metals, nickel, iron, silver or alloys thereof.

The cell of the invention is useful for a variety of electrochemical processes wherein it is advantageous to restrain the release of un-oxidated chemical species into the supporting electrolyte flowing through the interelectrodic gap of the cell.

Referring now to the drawings:

FIG. 1 is a schematic diagram of the process of the present invention and

FIG. 2 is a partial cross-sectional view of an electrolysis cell of the present invention.

FIG. 3 is a cross-sectional view of the cell of FIG. 2.

FIG. 4 is a cross-sectional view of another embodiment of an electrolysis cell of the present invention.

FIG. 5 is a partial cross-sectional view of an alternative embodiment of an electrolysis cell of the present invention and FIG. 6 is a cross-sectional view of the cell of FIG. 5.

With reference to FIG. 1, the apparatus of the invention comprises an electrolysis cell 1 consisting of a compartment 2 containing a cathode 3 made of steel or nickel or hastelloy or titanium or other electrically conducting material exhibiting a low overvoltage to hydrogen evolution and a compartment 4 separated from compartment 2 by a porous anode 5 made of a sintered valve metal activated with non passivatable and electrocatalytic material resistant to the anodic environment. The brine circuit is comprised of a saturation tank 6 where salt and the brine solution are contacted, a circulating pump 7, preferably upstream to the electrolytic cell 1, a second valve 8 downstream to the electrolytic cell and a suitable direct current supply.

The electrolyte leaving the compartment 2 after electrolysis contains hypochlorite and the hydrogen which is produced at the cathode. A suitable gas separation tank 9 allows the venting of gaseous hydrogen from the effluent hypochlorite solution. The automatic control of the optimal pressure differential through the porous anode 5 may be effected by two pressure gauges 10 and 11 in the brine compartment 4 and in the water compartment 2, respectively. Pneumatic or electric signals from the two gauges are suitably operated by a control device which, through an actuating system, acts on control valve 8.

FIG. 2 shows schematically a typical embodiment of the cell according to the present invention wherein the cell is comprised of a first body consisting of a container 20, preferably of titanium, provided with a flange 21. A porous anode 22 made of sintered titanium activated preferably with mixed oxides of ruthenium and titanium is welded to the internal perimeter of the flange 21. One inlet 23 and one outlet 24 allow brine to recycle through the compartment. The second cell body consists of a steel container 25 on whose flange a cathode 25, preferably made of stainless steel is welded and an inlet 27 and an outlet, not illustrated, are provided at the two ends of container 25. The cathode 26 may consist of a plate or mesh or expanded sheet and it stops short of the two ends of container 25 to allow flowing of the electrolyte between the porous anode 22 and cathode 26. An insulating gasket 28 electrically insulates the cathode from the anode and suitable electric terminals, which are not illustrated, supply electric current to the anodic flange 21 and to the cathodic flange. FIG. 3 is a transversal cross section of the cell of FIG. 2 and in both figures, the same parts are indicated by the same number.

FIG. 4 shows another embodiment of the cell of the invention particularly suitable for small capacities. It consists of a porous titanium tube 41 suitably activated with an electrocatalytic coating which is welded at one end to a titanium tube 42 and is provided with a sealing flange 43 and at the other end to another titanium tube 44. The assembly is then introduced into a flanged tube 45 made of steel or stainless steel or nickel which is connected to a line of the electrolyte solution by two elbows 46 and 47, preferably made of inert, non conductive material and provided with suitable extensions 48 and 49 for effecting a hydraulic seal with the titanium tubes. Sealing is effected on one end by gasket 50 and on the other end by packing box 40 or equivalent. During operation, concentrated brine is continuously circulated inside the titanium tube which is connected to the positive pole of the current supply, while tube 45 is connected to the corresponding negative pole. The porous titanium tube 41 acts as the anode and the internal surface of pipe 45 act as the cathode.

By the embodiment incorporating concentric, tubular electrodes such as that illustrated in FIG. 4, high capacity cells can be realized since as large a number of the elements as desired can be assembled in a fashion similar to the configuration of conventional tube heat exchangers. For example, a cell similar to a tube heat exchanger can be realized utilizing activated porous titanium tubes which allow brine circulation in the casting and water circulation inside the porous tubes. The cathode may consist of an array of rods welded to one of the cell heads and inserted concentrically inside every anodic tube. Alternatively, brine may be circulated through the porous titanium tubes and water in the tube sheet casing. In this case, foraminous screens concentrically arranged outside the porous titanium pipes and electrically connected to the casing act as cathodes.

FIG. 5 shows another embodiment of the cell of the invention which consists of a cylindrical container 51 flanged at both ends and this container may be easily inserted into a line of the water to be treated. The cylinder may be provided with two rectangular, flanged openings, diametrically opposed. Anode 52 consists of a rectangular box closed on all sides and made of titanium or other valve metal, and it is inserted into one of the two openings. The box is closed on one side by titanium flange 53 adapted to the flanged opening of the cylinder. The large surfaces of the anode 52 consist, at least partially, of porous plate 54 made of titanium or other sintered valve metal and the porous plates are preferably activated by mixed oxides of titanium and ruthenium.

Titanium flange 53 is provided with at least two nozzles 55 and 56 for brine inlet and outlet, respectively and brine is continuously circulated inside the anodic box 52 to maintain the brine concentration at a constant level. An insulating gasket 57 provides electrical insulation of the anode from container 51 and terminal 58 supplies the anode with the electric current. The cathode of the cell, placed in the opposite opening, consists of two sheets 59a and 59b made of steel, nickel or stainless steel welded to flange 60 which is adapted to the container flanged opening. A suitable terminal 61 supplies the cathode with electric current. The two sheets constituting the cell cathode are placed some millimeters apart from anode 52 surface and suitable spacers such as a series of polyvinyl chloride buttons bonded to the surface of cathodes 59a and 59b to prevent the electrodes from contacting each other during assembly or operation.

FIG. 6 is a transversal cross-section of the cell of FIG. 5 and in both figures, the same parts are indicated by the same numbers. FIG. 6 shows the spacers 62 consisting of Teflon rods having a diameter of 3.5 mm bonded to the surface of the anodic box 52.

During operation, the electrolyte or the dilute hypochlorite solutions flows through the container 51 and part of the flow passes between the opposed surfaces of the anode, which is substantially constituted by the activated titanium porous plates on both the larger sides of box 52 and of the cathode consisting of the two sheets 59a and 59b. The chlorine evolved at the anode reacts with the hydroxide of the alkali metal to generate hypochlorite, while hydrogen is evolved at the cathode as a result of water electrolysis. The cell is particularly suited for direct chlorination of water, for example in potable water systems or for swimming pool sterilization, etc. In fact, the hypochlorite or active chlorine quantity produced in the unit of time can be easily controlled by varying the current supplied to the cell, proportionately to the overall water flow through container 51.

The free cross-section of container 51 can be suitably dimensioned with respect to the overall current supplied to the cell to obtain directly the required concentration of hypochlorite in the effluent, that is to say concentrations in the range of 0.5–1 mg/l. In this way, collecting means of the concentrated hypochlorite solution and dosing systems and no longer required. Moreover, an automatic control can be easily realized for regulating the overall current supplied to the cell proportionate to the electrolyte flow to maintain the active chlorine concentration in the effluent under the maximum tolerable limit.

In the following examples there are described several preferred embodiments to illustrate the invention. However, it is to be understood that the invention is not intended to be limited to the specific embodiments.

EXAMPLE 1

The test was conducted with the apparatus of FIG. 1 using the electrolysis cell of FIG. 2 having an apparent (projected) anodic surface area of about 10 cm$^2$. The anode consisted of a porous sintered titanium plate with a thickness of 1.5 mm, a porosity of 65% and an average pore diameter of 25 microns. The porous titanium substrate was degreased and then pickled in dilute hydrochloric acid solution for one minute and was then completely immersed in a solution comprised of 5 ml of 5% hydrochloric acid, 10.8 mg of TiCl$_3$ (calculated as metal), 9 mg of RuCl$_3$ (calculated as metal), 0.2 mg of SnCl$_4$.5H$_2$O (calculated as metal), 5 drops of isopropyl alcohol and 2 to 4 drops of hydrogen peroxide. The porous titanium was then dried in air at 30° C. and was heated in a forced air circulation oven at 350° C. for 10 minutes. The process was repeated a number of times until the porous titanium showed a weight increase corresponding to 25 g/m$^2$ and with the resulting electrocatalytic coating. The brine permeability of the activated porous titanium anode decreased to about 60% of the original permeability.

Brine containing 300 g/l of sodium chloride was continuously circulated in the anode compartment of the cell to always maintain a sodium chloride content in the brine effluent above 298 g/l and water was circulated through the cathode compartment. During the test, the temperature in the cell was maintained between 14° to 17° C. by the circulating water. The hydrostatic pressure differential through the porous anode was kept at zero while the current density was increased as well as the water flow to keep the concentration of active chlorine equivalent between 100 and 500 mg/l in the effluent electrolyte. The cell voltages, amount of chloride ion in the effluent and the overall current efficiency are reported in Table I.

TABLE I

| Current density $A/m^2$ | Cell Voltage V | $Cl_2$ equivalent Concentration mg/l | NaCl Concen. mg/l | Active $Cl_2$/ NaCl Ratio | Overall Current Efficiency % |
|---|---|---|---|---|---|
| 500 | 4 | 98 | 400 | 0.245 | 54 |
| 1000 | 4.5 | 150 | 600 | 0.25 | 68 |
| 2000 | 6 | 300 | 1000 | 0.30 | 70 |
| 3000 | 7 | 350 | 1100 | 0.32 | 65 |
| 4000 | 8 | 350 | 1090 | 0.32 | 55 |
| 6000 | 12 | 500 | 1000 | 0.46 | 48 |

The results of Table I show that the overall current efficiency tended to diminish as the current density increased beyond the limit of between 1000 and 3000 $A/m^2$ and this was due to an increase in anodic polarization with consequent oxygen evolution due to water electrolysis and also due to anodic oxidation of the hypochlorite to chlorate which contributed to the decrease of the overall current efficiency.

At this point, the current density was held at 2000 $A/m^2$ and an increasing hydrostatic pressure difference was applied through the porous anode by increasing the hydrostatic pressure on the brine with respect to the water in order to supply more chloride ions to the anodic surface through the porosity of the anode. The results are reported on the following Table II.

TABLE II

| $\Delta p$ cm of $H_2O$ | Cell Voltage V | $Cl_2$ equiv. concent. mg/l | NaCl Concent. mg/l | Active $Cl_2$/NaCl Ratio | Overall Current Efficiency % |
|---|---|---|---|---|---|
| 0 | 6 | 300 | 1050 | 0.30 | 70 |
| 2.5 | 5.8 | 310 | 1050 | 0.33 | 74 |
| 4.0 | 5.1 | 383 | 1020 | 0.37 | 88.5 |
| 6.0 | 4.7 | 394 | 1200 | 0.33 | 91.2 |

The results of Table II clearly show that when a minimum hydrodynamic brine flow is created through the porous anode by maintaining a certain pressure difference across the porous anode, the cell voltage and consequently the process energy efficiency and the overall current efficiency are exceptionally improved. Al the same time, under these conditions, the ratio between the active chlorine and the chloride ion contained in the electrolyte leaving the cell was not at all reduced but slightly improved, which is explainable by the exceptional increase of the overall current efficiency.

Various modifications of the process and electrolysis cell of the invention may be made without departing from the spirit or scope thereof and it should be understood that the invention is intended to be limited only as defined in the appended claims.

We claim:

1. A process for halogenating water comprising passing an electrolysis current through a porous permeable anode and a cathode forming an electrodic gap with water passing therethrough, passing an aqueous solution of an alkali metal halide containing at least 25 g/l of said halide through the porous, permeable anode into the electrodic gap and controlling the hydrodynamic flow through the said anode to maintain the weight ratio of active halogen to halide in the water leaving the electrodic gap of at least 0.2.

2. The process of claim 1 wherein the alkali metal halide is sodium chloride and the active halogen contained in the water effluent from the cell is substantially sodium hypochlorite.

3. The process of claim 1 wherein the porous and permeable anode is comprised of a rigid element with at least a layer of sintered valve metal powder having a porosity between 20 and 70% and an average pore diamter between 5 and 100 microns, said porous valve metal layer being activated by impregnation with an electrocatalytic material exhibiting a low overvoltage to halogen evolution.

4. The process of claim 3 wherein the valve metal is titanium and the electrocatalytic material is at least one metal selected from the group consisting of platinum, palladium, ruthenium, iridium, osmium and rhodium in metallic form and oxides thereof.

5. The process of claim 1 wherein a hydrostatic pressure difference through the thickness of said porous and permeable anode is kept constant and is comprised of 0 and 1 m of water column in the positive sense from the brine side to the electrolyte side of the anode.

6. The process of claim 1 wherein the electrodic surfaces of the electrolysis cell are parallel to each other and both lay on parallel planes with respect to the flux lines of the water flowing through the cell.

7. The process of claim 1 wherein the concentration of the brine in contact with the porous and permeable anode is kept substantially constant by forced brine circulation through the brine compartment of the electrolysis cell and through the concentration apparatus located outside the electrolysis cell.

8. The process of claim 5 wherein the hydrostatic pressure difference through the thickness of said porous and permeable anode is automatically kept constant by an automatic control means acting on a control valve placed in the brine circuit downstream to the electrolysis cell, said control means being actuated by two pressure gauges, one set in the brine compartment of the electrolysis cell and the other in the water compartment of the electrolysis cell.

9. A process for the electrolytic production of an aqueous solution of sodium hypochlorite by electrolysis of sodium chloride carried out at a temperature below 25° C., characterized in that water is flowed through an electrolysis cell consisting of a cathode and a porous, permeable anode having low overvoltage to chlorine evolution, the anode surface not exposed to the contact to the water flow being maintained in contact with brine containing at least 25 g/l of sodium chloride and hydrodynamic flow through said porous, permeable anode is limited by controlling the hydrostatic pressure difference through the thickness of said anode to maintain a weight ratio between the active halogen and the halide contained in the solution effluent from the cell greater than 0.2.

* * * * *